Aug. 20, 1946. LE ROY B. HIGH ET AL 2,405,952
TORCH
Filed Nov. 25, 1943
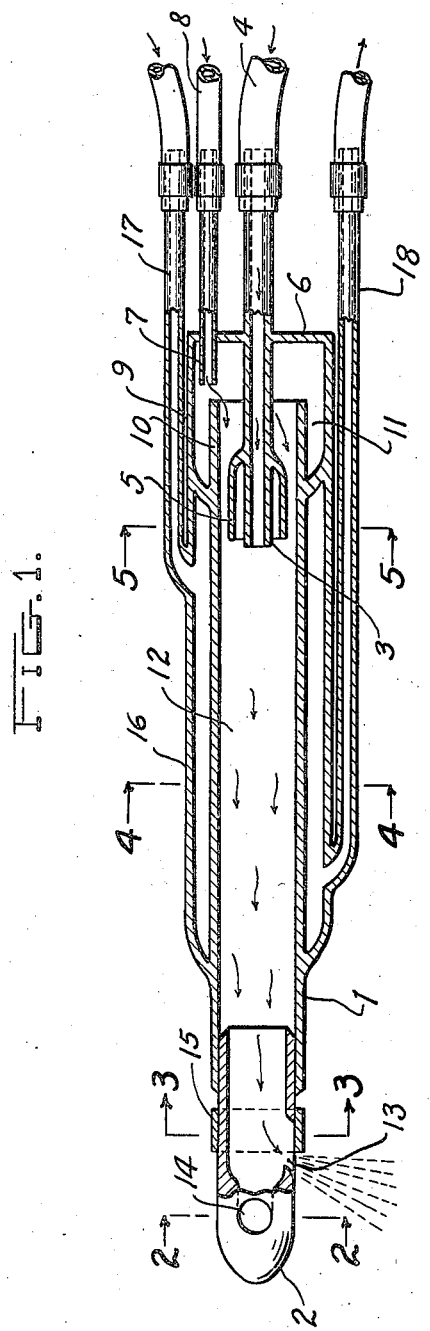
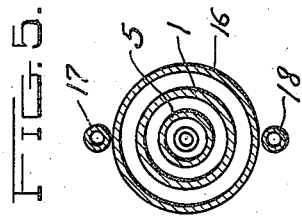
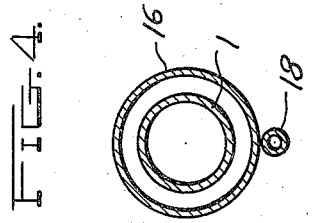
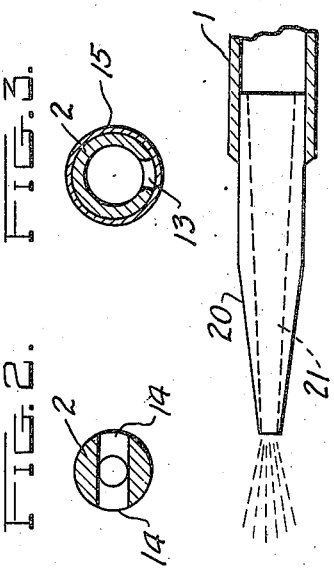
INVENTORS
Le Roy B. High
Jack B. Harmon
BY
Barnes, Kisselle, Laughlin & Raisch
Attorneys Patented Aug. 20, 1946

2,405,952

UNITED STATES PATENT OFFICE 2,405,952

TORCH

Le Roy B. High and Jack B. Harmon, Detroit, Mich., assignors to The Udylite Corporation, Detroit, Mich., a corporation of Delaware Application November 25, 1943, Serial No. 511,660

3 Claims. (Cl. 158—13.6)

This invention relates to a torch and more particularly to a torch useful for welding thermoplastic materials.

It is an object of this invention to produce a torch useful in the welding of thermoplastic materials which is operated with air and natural or ordinary city gas.

Heretofore torches burning natural or city gas have not been used in welding thermoplastics largely because of the inability to control the temperature of the torch within limits suitable for such type welding. This invention also contemplates a gas burning torch useful for welding thermoplastic materials in which the temperature of the gas employed in the welding operation can be easily regulated at a temperature somewhere between the softening point and the thermal decomposition point of the thermoplastic being welded.

It is also an object of this invention to produce a combination hot air torch and ironer for welding thermoplastics.

In the drawing:

Fig. 1 is a longitudinal sectional view through our torch.

Figs. 2, 3, 4 and 5 are sections respectively along the lines 2—2, 3—3, 4—4 and 5—5 of Fig. 1.

Fig. 6 is a detail showing a modified form of welding tip.

Referring more particularly to the drawing it will be seen that the torch comprises a combustion chamber which conveniently takes the form of a tubular member 1, an ironing tip 2 affixed to one end of the combustion tube 1 and a gas nozzle 3 mounted in the other end of the tube 1.

Nozzle 3 is connected by means of a hose 4 with a source of gas under pressure, such as, for example, natural gas or ordinary city or coal gas. The nozzle 3 is provided adjacent its outlet end with a cup 5. The tube 1 has fixed to one end a header 6 which supports gas nozzle 3 and also serves as a support for air nozzle 7 which is connected by hose 8 with a source of air under pressure. Header 6 is fixed to cup 9 which is carried by and surrounds the air inlet end of tube 1. Cup 9 cooperates with the end 10 of the tube 1 which it surrounds to form an air distributing chamber 11. The air under pressure from nozzle 7 flows into distributing chamber 11 about the end 10 and then flows into the tube 1 through end 10. The air entering tube 1 is deflected by cup 5 outwardly about the gas nozzle 3.

Some of the air flowing into the tube 1 unites with the combustible gas flowing from nozzle 3 and burns in the combustion chamber 12 in the form of a flame. The length and temperature of this flame can be varied by regulating the amount of air and combustible gas fed into the combustion chamber from nozzles 3 and 7. The flame in the combustion chamber 12 heats the excess air flowing through the tube 1. This heated air and the gases of combustion flow through the tube 1 toward and through the hollow ironer tip 2. Some of this hot air and gaseous combustion product flows out of the tip 2 through orifice 13 and the rest of it flows out of orifices 14. Orifice 13 is controlled by an adjustable ring 15 which acts as a throttle for orifice 13. Thus, by adjusting ring 15 the effective size of orifice 13 can be made larger or smaller to either increase or decrease the amount of hot gas flowing out of orifice 13.

The hot gases flowing through the hollow tip 2 heat the tip to a temperature somewhere between the softening and decomposition temperatures of the thermoplastic being welded. Orifice 13 is positioned and provided with an adjustment for size so that the hot gases issuing from this orifice can be utilized in heating or melting the thermoplastic in the area being welded preparatory to ironing the same with the hot ironer 2. The gas which is not utilized by passing through orifice 13 is exhausted through orifices 14 and serves principally to maintain the ironer 2 at the temperature desired.

Preferably the combustion tube 1 is surrounded by a jacket 16 for cooling water which is admitted to the jacket through water line 17 and exhausted through water line 18. The temperature of the gases flowing out of orifices 13 and 14, as well as the temperature of the tip 2, are arranged to be controlled by regulating the output of air through nozzle 7 and the output of gas through nozzle 3. Generally speaking, as the amount of air from nozzle 7 is increased relative to the gas flowing from nozzle 3, over and above that necessary to give a combustible mixture, the temperature of the gases flowing from orifices 13 and 14 will decrease. The temperature of these gases will also increase as the air and combustible gas fed into the combustion chamber is increased to increase the size of the flame. Both the air line 8 and gas line 4 are provided with valves for regulating the flow of air and gas therethrough.

We have found that the above described torch can be used successfully in the welding of thermoplastics and the temperature of the gases flowing out of the torch, as well as the temperature of the ironer 2, can be controlled effectively to avoid any charring or thermal decomposition of the plastic being welded. Further, the water jacket maintains the torch cool so that it can be held in the bare hands without discomfort or burning of the operator's hands.

In welding thermoplastics the hot gas flowing from orifice 13 can be directed against either or both of the surfaces of the thermoplastic bodies which are to be welded until the surface or skin is melted, whereupon the melted surfaces can be brought together, preferably under pressure, and allowed to cool to effect a weld between the two bodies.

In those instances where the welding seam is exposed, the seam while in molten or softened condition can be ironed by means of heating tip 2 following the application of the hot gas blast from orifice 13 against the surfaces being welded.

This tool is particularly well adapted for welding together, along their edges, sheets or webs of thermoplastic material to form a laminated thermoplastic body or article. In such case the tool will be drawn along the edges of the laminations so that the hot blast from orifice 13 will melt the edges of the thermoplastic laminations and ironer 2 will follow the hot blast to iron out and effect a smooth sealing or joining of the laminations along their edges.

Tip 2 is arranged to be slid into and have a telescoping friction fit with tube 1. Tip 2 is made removable because it is proposed to use various types of welding tips with this torch.

In Fig. 6 there is shown another form of tip or nozzle 20, one end of which has been slipped into the end of tube 1. Nozzle 20 has a straight bore 21 which allows all the hot gases generated by the torch to flow therethrough and be directed on one particular spot. The type of tip that will be used with this torch will, of course, depend upon the particular type of welding job on which this torch is being used.

We claim:

1. A torch comprising an elongated member forming a combustion chamber, one end of said member having an exhaust port therein and the other end having an air inlet opening therein, a nozzle for supplying a combustible gas under pressure extending through said air inlet opening and projecting into the said combustion chamber, a cup surrounding said gas nozzle and spaced from the side walls of said combustion chamber, said nozzle outlet being spaced from the inside wall of said cup and said cup being closed inwardly against the nozzle upstream from the nozzle outlet, means forming an air distributing chamber surrounding the air inlet opening for said combustion chamber, inlet means for supplying air under pressure into said distributing chamber and offset from the air inlet into the combustion chamber whereby the air upon flowing into the combustion chamber and by the said cup is distributed about the combustible gas nozzle whereby the gaseous mixture burns in said combustion chamber and the products of combustion are exhausted in the form of a hot gaseous jet from said exhaust outlet.

2. A torch adapted for welding thermoplastic materials comprising means forming an elongated, imperforate combustion chamber, inlet means at one end of said combustion chamber respectively for air and a combustible gas under pressure whereby said gas burns in said combustion chamber, the other end of said combustion chamber being in the form of an ironer in heat exchange relation with the hot gases of combustion, means forming at least two exhaust outlets for the gaseous products of combustion located adjacent said ironer end of the combustion chamber opposite the inlet end of the same, said exhaust outlets being spaced circumferentially at least about 90° whereby the portion of gaseous products flowing from one of the exhaust outlets can be directed on to a surface for pre-heating the same preparatory to ironing the surface with the heated ironer and the other portion of exhaust gases flowing from the other exhaust outlet can be directed away from the surface being heated, and a valve for controlling one of said exhaust outlets, said valve being adjustable to vary the amount of exhaust gases flowing from one of said exhaust outlets and inversely vary the amount of exhaust gases flowing from the other outlet.

3. The combination as set forth in claim 2 wherein the combustion chamber is a tube and the valve is a ring mounted over and adjustable longitudinally of said tube to control the effective size of one of said exhaust outlets.

LE ROY B. HIGH.
JACK B. HARMON.